United States Patent

[11] 3,603,865

| [72] | Inventor | Benjamin C. Liebenthal<br>La Grange, Ill. |
|---|---|---|
| [21] | Appl. No. | 862,433 |
| [22] | Filed | Sept. 30, 1969 |
| [45] | Patented | Sept. 7, 1971 |
| [73] | Assignee | General Motors Corporation<br>Detroit, Mich. |

[54] ELECTRONIC ANALOG FOR AN ELECTROMECHANICAL RELAY
1 Claim, 3 Drawing Figs.

| [52] | U.S. Cl. | 321/47 |
|---|---|---|
| [51] | Int. Cl. | H02m 7/12 |
| [50] | Field of Search | 317/148.5; 321/38, 47; 323/22 T, 22 SC |

[56] References Cited
UNITED STATES PATENTS

| 3,149,224 | 9/1964 | Horne et al. | 317/148.5 X |
|---|---|---|---|
| 3,204,120 | 8/1965 | Naken | 317/123 CM |
| 3,210,605 | 10/1965 | Jones | 317/148.5 X |
| 3,210,645 | 10/1965 | Dyke | 323/22 T |
| 3,253,209 | 5/1966 | Hordosi | 323/22 T X |
| 3,496,453 | 2/1970 | Swain | 323/22 SC |

Primary Examiner—William M. Shoop, Jr.
Attorneys—E. W. Christen, C. R. Meland and Tim G. Jagodzinski ABSTRACT: A static relay includes a control circuit which regulates the operation of a switching circuit. The control circuit performs the function of the control winding of a conventional electromechanical relay. The switching circuit performs the function of the switching contacts of a conventional electromechanical relay. The control circuit and the switching circuit are electrically isolated from each other.

PATENTED SEP 7 1971  3,603,865
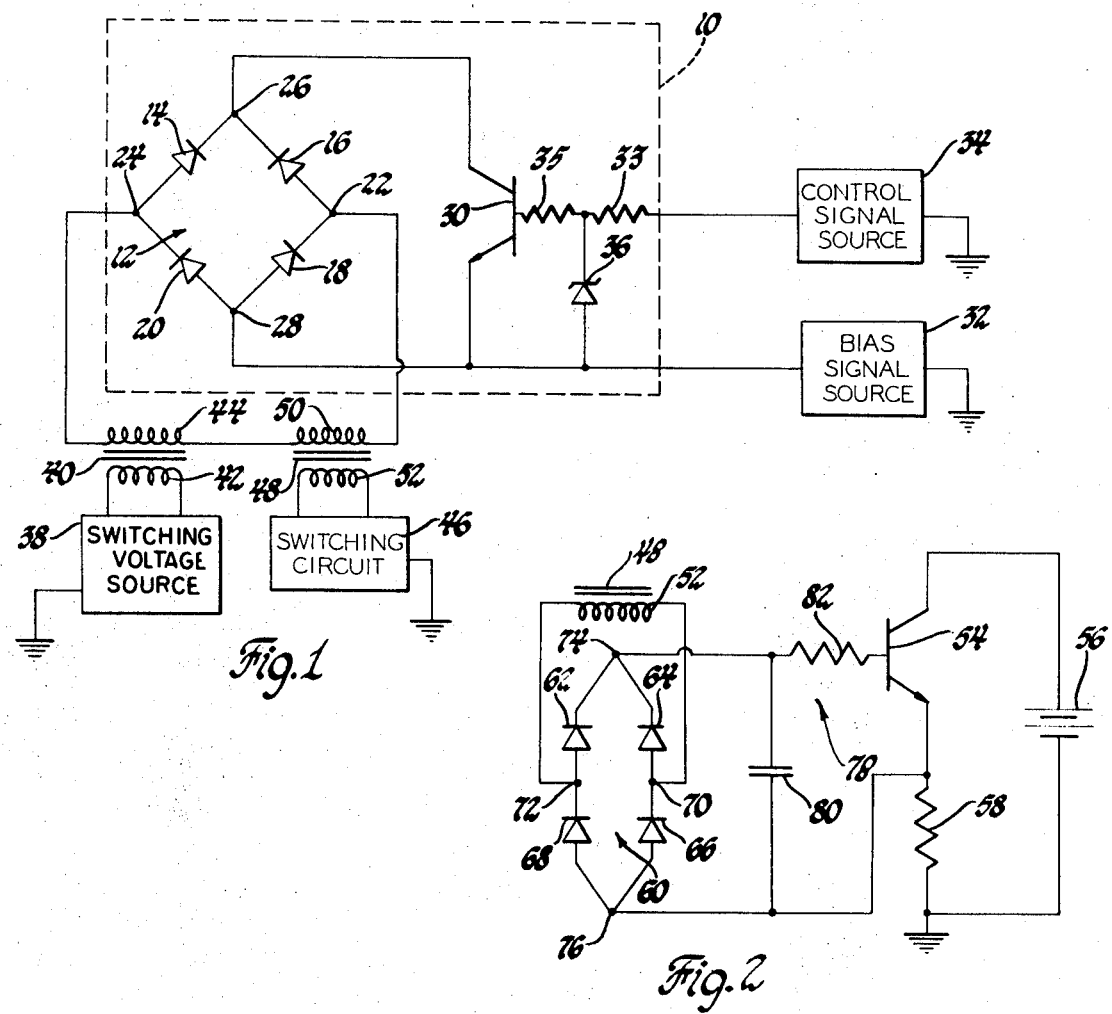
Fig.1
Fig.2
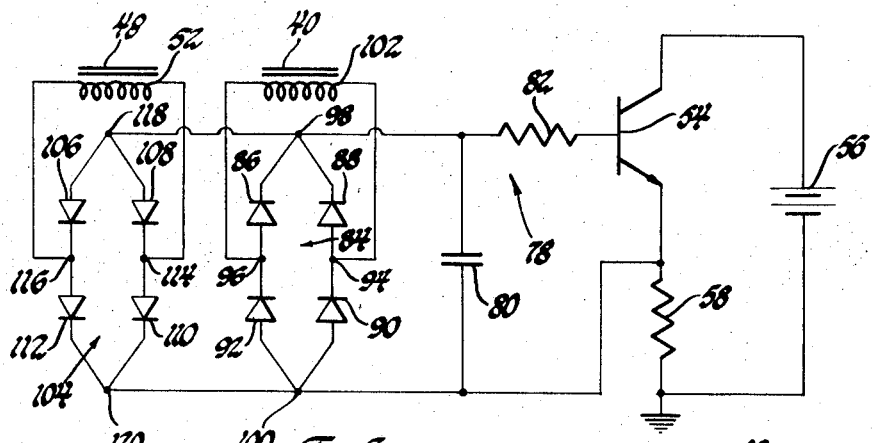
Fig.3
INVENTOR.
Benjamin C. Liebenthal
BY
C. L. Meland
ATTORNEY

ELECTRONIC ANALOG FOR AN ELECTROMECHANICAL RELAY

This invention relates to a solid-state relay for replacing a conventional electromechanical relay.

According to one aspect of the invention, a control circuit regulates the operation of an electrically isolated switching circuit. In general, this is accomplished by providing an input transformer connected between a switching voltage source and the control circuit, and an output transformer connected between the control circuit and the switching circuit. The control circuit selectively regulates the application of a switching voltage from the switching voltage source to the switching circuit by selectively controlling the coupling of the switching voltage between the input transformer and the output transformer.

In another aspect of the invention, the control circuit performs the function of the control winding of a conventional electromechanical relay. Generally, this is accomplished by providing a control switching device connected across a control bridge rectifier which is coupled between the input and output transformers. The control switching device is responsive to a control signal to effectively connect the input and output transformers together so as to couple the switching voltage from the input transformer to the output transformer.

According to a further aspect of the invention, the switching circuit performs the function of the switching contacts of a conventional electromechanical relay. In general, this is accomplished by connecting a power-switching device to the output transformer through a converter. The converter changes the power voltage received from the output transformer to a drive voltage which is applied to operate the power-switching device. The power-switching device may be appropriately biased so as to provide a normally open or a normally closed mode of operation.

These and other aspects of the invention will become more apparent by reference to the following detailed description of a preferred embodiment when considered in conjunction with the accompanying drawing, in which:

FIG. 1 is a schematic diagram of a static relay incorporating the principles of the invention.

FIG. 2 is a schematic diagram of a normally open switching circuit.

FIG. 3 is a schematic diagram of a normally closed switching circuit.

FIG. 1 discloses a preferred embodiment of the invention static relay. A control circuit 10 includes a full-wave control bridge rectifier 12 comprising diodes 14, 16, 18 and 20 which are poled so as to provide a pair of AC input terminals 22 and 24 and a pair of DC output terminals 26 and 28. The control circuit 10 also includes switching device provided by a junction transistor 30 having base, emitter and collector electrodes. Although the transistor 30 is shown to be of the NPN type, it may also be of the PNP type. The emitter and collector electrodes of the transistor 30 are connected to the output terminals 26 and 28, respectively, of the bridge rectifier 12 so as to connect the transistor 30 across the output bridge rectifier 12.

A bias signal source 32 is connected directly to the emitter electrode of the transistor 30 in the control circuit 10 for applying a bias or reference signal to the emitter electrode. The bias signal source 32 may be provided by any suitable bias device such as a voltage divider network connected in parallel with a voltage source. A control signal source 34 is connected through a pair of resistors 33 and 35 to the base electrode of the transistor 30 in the control circuit 10 for providing a control signal to the base electrode. The control signal source 34 may be provided by any suitable control device such as a control switch connected in series with a voltage source or a variable potentiometer connected in parallel with a voltage source. A voltage limiter is provided by a Zener diode 36 having an anode and a cathode. The anode of the diode 36 is connected to the junction between the resistors 33 and 35 and the cathode of the diode 36 is connected to the emitter electrode of the transistor 30 so as to effectively connect the diode 36 between the bias signal source 32 and the control signal source 34.

A switching voltage source 38 is connected with the control circuit 10 through an input transformer 40 having a primary winding 42 and a secondary winding 44. Similarly, a switching circuit 46 is connected to the control circuit 10 through an output transformer 48 having a primary winding 50 and a secondary winding 52. The primary winding 42 of the input transformer 40 is connected across the switching voltage source 38. The secondary winding 52 of the output transformer 48 is connected across the switching circuit 46. The secondary winding 44 of the input transformer 40 and the primary winding 50 of the output transformer 48 are connected in series across the input terminals 22 and 26 of the bridge rectifier 12.

In operation, the bias signal source 32 provides a positive reference signal to the emitter electrode of the transistor 30, and the control signal source 34 provides a positive control signal to the base electrode of the transistor 30. When the control signal does not exceed the bias signal by a sufficient amount, the transistor 30 is reverse biased so as to render the transistor 30 fully nonconductive. In the nonconductive state, the transistor 30 effectively places an open circuit across the output terminals 26 and 28 of the bridge rectifier 12 thereby to also effectively place an open circuit across the input terminals 22 and 24 of the bridge rectifier 12. Conversely, when the control signal does exceed the bias signal by a sufficient amount, the transistor 30 is forward biased so as to render the transistor 30 fully conductive. In the conductive state, the transistor 30 effectively places a short circuit across the output terminals 26 and 28 of the bridge rectifier 12 thereby to also effectively place a short circuit across the input terminals 22 and 24 of the bridge rectifier 12.

The Zener diode 36 protects the transistor 30 in the event that the control signal produced by the control signal 34 is greatly in excess of the bias signal produced by the bias signal source 32. The diode 36 limits the voltage applied across the base and emitter electrodes of the transistor 30 by shunting any excessive voltage from the control signal source 34 through the current-limiting resistor 33 to the bias signal source 32. Accordingly, the control circuit 10 is responsive to a relatively small voltage difference between the control signal and the bias signal, but yet is able to withstand a relatively large voltage difference between the control signal and the bias signal.

The switching voltage source 38 provides an AC switching voltage across the primary winding 42 of the input transformer 40. When the input terminals 22 and 24 of the bridge rectifier 12 are effectively open circuited by the transistor 30, the switching voltage is not coupled from the switching voltage source 38 to the switching circuit 46. However, when the input terminals 22 and 24 of the bridge rectifier 12 are effectively short circuited by the transistor 30, a circuit is effectively completed between the secondary winding 44 of the input transformer 40 and the primary winding 50 of the output transformer 48. In this condition, the switching voltage is coupled across the input transformer 40 from the primary winding 42 to the secondary winding 44. Further, the switching voltage is coupled across the output transformer 48 from the primary winding 50 to the secondary winding 52. The switching circuit 46 receives the switching voltage form the secondary winding 52 of the output transformer 48.

FIG. 2 disclosed a preferred embodiment of a normally open switching circuit 46. A power-switching device is provided by a junction transistor 54 having base, emitter and collector electrodes. Again, although the transistor 54 is shown to be of the NPN type, it may also be of the NPN type. The transistor 54 is connected in series between a voltage source 56 and a load 58. The voltage source 56 may be conveniently provided by a conventional battery. A full-wave switching bridge rectifier 60 comprises diodes 62, 64, 66 and 68, poled so as to provide a pair of AC input terminals 70 and 72, and a pair of DC output terminals 74 and 76. The input terminals 70 and 72 of the bridge rectifier 60 are connected across the secondary winding 52 of the output transformer 48. The negative output terminal 76 of the bridge rectifier 60 is connected directly to the emitter electrode of the transistor 54. A filter 78 is provided by a capacitor 80 connected with a resistor 82. The capacitor 80 is connected between the output terminals 74 and 76 of the bridge rectifier 60. The resistor 82 is connected between the positive output terminal 74 of the bridge rectifier 60 and the base electrode of the transistor 54.

In operation, the transistor 54 is normally reverse biased so as to render the transistor 54 fully nonconductive. However, when the AC power voltage is coupled between the input and output transformers 40 and 48, the power voltage is also applied across the input terminals 70 and 72 of the bridge rectifier 60 by the secondary winding 52 of the output transformer 48. The bridge rectifier 60 provides a positive full-wave-rectifier output at the positive output terminal 74. The filter 78 averages the positive full-wave-rectified output of the bridge rectifier 60 to provide a positive drive voltage to the base electrode of the transistor 54. Thus, the bridge rectifier 60 and the filter 78 form a converter for changing the AC power voltage to a positive DC drive voltage. The transistor 54 is forward biased by the positive drive voltage so as to render the transistor 54 fully conductive. In the conductive state, the transistor 54 applies a voltage from the voltage source 56 to the load 58. Hence, the transistor 54 acts as a normally open switch which is closed in response to the application of the power voltage across the secondary winding of the output transformer 48.

FIG. 3 discloses a preferred embodiment of a normally closed switching circuit 46. The switching circuit of FIG. 3 is substantially similar to the switching circuit of FIG. 2 and like numerals are used to denote like elements. A first full-wave switching bridge rectifier 84 comprises diodes 86, 88, 90 and 92 poled so as to provide a pair of AC input terminals 94 and 96 and a pair of DC output terminals 98 and 100. The input terminals 94 and 96 of the bridge rectifier 84 are connected across an auxiliary secondary winding 102 of the input transformer 40. Like the secondary winding 44, the auxiliary secondary winding 102 is inductively coupled to the primary winding 42 of the input transformer 40. However, unlike the secondary winding 44, the auxiliary secondary winding 102 is not connected to the primary winding 50 of the output transformer 48. The negative output terminal 100 of the bridge rectifier 84 is connected directly to the emitter electrode of the transistor 54. The positive output terminal 98 of the bridge rectifier 84 is connected to the filter 78. A second full-wave switching bridge rectifier 104 comprises diodes 106, 108, 110 and 112 poled so as to provide a pair of AC input terminals 114 and 116 and a pair of DC output terminals 118 and 120. The input terminals 114 and 116 of the bridge rectifier 104 are connected across the secondary winding 52 of the output transformer 48. The positive output terminal 120 of the bridge rectifier 104 is connected directly to the emitter electrode of the transistor 54. The negative output terminal 118 of the bridge rectifier 104 is connected to the filter 78.

In operation, the AC power voltage produced by the power voltage source 38 is coupled from the primary winding 42 of the input transformer 40 to the auxiliary secondary winding 102 which applies the power voltage across the input terminals 94 and 96 of the bridge rectifier 84. The bridge rectifier 84 provides a full-wave-rectifier positive output signal at the positive output terminal 98. The filter 78 averages the positive full-wave-rectified output of the bridge rectifier 84 to provide a positive drive voltage to the base electrode of the transistor 54. The transistor 54 is forward biased by the positive drive voltage so as to tender the transistor 54 fully conductive. In the fully conductive state, the transistor 54 normally applies a voltage from the voltage source 56 to the load 58.

However, when the AC power voltage is coupled between the input and output transformers 40 and 48 by the control circuit 10, the power voltage is also applied across the input terminals 14 and 16 of the bridge rectifier 104. The bridge rectifier 104 provides a full-wave-rectified negative output at the negative output terminal 118. The negative output of the bridge rectifier 104 opposes the positive output of the bridge rectifier 84 thereby to reduce the magnitude of the resultant output voltage applied to the filter 78. The decrease in the resultant output voltage applied to the filter 78 reduces the magnitude of the drive voltage produced by the filter 78. Accordingly, the transistor 54 is reverse biased by the reduced drive voltage so as to render the transistor 54 fully nonconductive. In the nonconductive state, the transistor 54 terminates the application of the voltage from the voltage source 56 to the load 58. Hence, the transistor 54 acts as a normally closed switch which is opened in response to the application of the power voltage across the secondary winding 52 of the output transformer 48.

It will now be apparent that the invention provides a static relay capable of duplicating the performance of a conventional electromechanical relay while eliminating the inherent disadvantages of an electromechanical relay such as winding failure and contact wear. The control circuit 10 of the inventive static relay performs the function of the control winding of a conventional electromechanical relay. Similarly, the switching circuit 46 of the inventive static relay performs the function of he switch contacts of a conventional electromechanical relay. In this respect, a plurality of switch circuits 46 comprising any desired combination of normally open switching circuits as shown in FIG. 2 or normally closed switching circuits as shown in FIG. 3 may be operated by a single control circuit 10 much the same as a plurality of normally open and normally closed contacts may be operated by a single control winding in a conventional electromechanical relay. Further, the inventive static relay is sensitive to extremely small control signals, but yet is insensitive to excessively large control signals.

It is to be understood that the preferred embodiment of the invention described herein is shown for illustrative purposes only, and various alterations and modifications may be made thereto without departing from the spirit and scope of the invention. As an example, the bridge rectifiers 60, 80 and 104 may be half-wave bridge rectifiers rather than full-wave bridge rectifiers.

What is claimed is:

1. A static relay comprising: an input transformer and an output transformer each having a primary winding and a secondary winding, the input transformer further having an auxiliary secondary winding, a switching voltage source connected across the primary winding of the input transformer for supplying an AC switching voltage, a control circuit for functioning like the control winding of an electromechanical relay, the control circuit including a full-wave control bridge rectifier having a pair of AC terminals and a pair of DC terminals, the AC terminals connected in series with the secondary winding of the input transformer and the primary winding of the output transformer, the control circuit further including a control transistor having emitter and collector electrodes connected across the DC terminals of the control bridge rectifier and having a base electrode, the transistor rendered fully conductive between the emitter and collector electrodes in response to a predetermined potential difference between a control signal applied to the base electrode and a bias signal applied to the emitter electrode thereby to apply the AC switching voltage from the secondary winding of the input transformer to the primary winding of the output transformer, a control signal source connected to the base electrode of the control transistor for applying a control signal to the transistor, a bias signal source connected to the emitter electrode of the transistor for applying a bias signal to the transistor, a Zener diode effectively connected between the base and emitter electrodes of the control transistor between the control signal source and the bias signal source for protecting the control transistor from an excessive potential difference between the control signal and the bias signal, a switching network for functioning like the normally closed switching contacts of an electromechanical relay, the switching circuit including first and second full-wave switching bridge rectifiers, the first switching bridge rectifier connected across the auxiliary secondary winding of the input transformer for producing a first rectified DC output voltage having a first polarity in response to the AC switching voltage, the second switching bridge rectifier connected across the secondary winding of the output transformer for producing a second rectified DC output voltage having a second polarity in response to the AC switching voltage, the switching circuit further including a filter connected to the first and second switching bridge rectifiers for averaging the first and second rectified DC output voltages to produce a DC drive voltage having a first magnitude in response to the first rectified DC output voltage and having a second magnitude in response to both the first and second rectified DC output voltages, the switching circuit also including a power transistor having emitter and collector electrodes connected in series with a load and having a base electrode connected to the filter, the power transistor rendered fully conductive between the emitter and collector electrodes to energize the load when the drive voltage applied to the base electrode is at the first magnitude and rendered fully nonconductive between the emitter and collector electrodes to deenergize the load when the drive voltage applied to the base electrode is at the second magnitude.